United States Patent Office 3,408,625
Patented Oct. 29, 1968

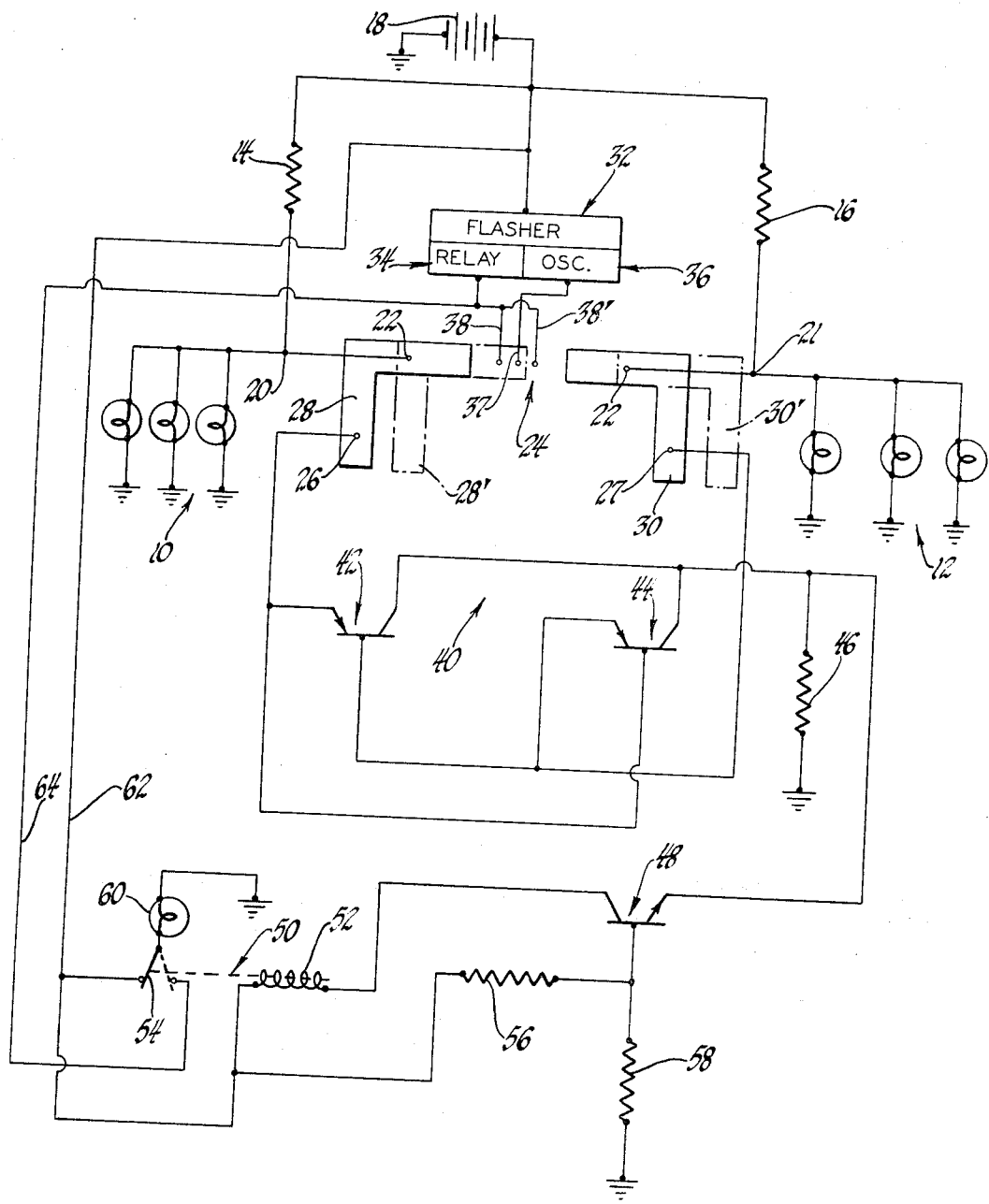

3,408,625
LAMP BURNOUT DETECTION CIRCUIT
Kenneth R. Skinner, Anderson, Ind., assignor to General Motors Corporation, Detroit, Mich., a corporation of Delaware
Filed Aug. 3, 1965, Ser. No. 476,815
4 Claims. (Cl. 340—79)

ABSTRACT OF THE DISCLOSURE

A circuit for detecting burnout of a turn signal lamp is disclosed which utilizes the usual turn signal pilot lamp as a lamp burnout indicator. The circuit includes a turn signal switch which, in the neutral position, connects transistorized detector means across the output of a bridge network comprising the signal lamps. Any unbalance in the bridge is detected and amplified and energizes a relay which is effective to connect the pilot lamp directly across the battery providing a constant energization thereof as an indication of lamp burnout.

---

This invention relates to lamp burnout detecting circuits and more particularly to a circuit for detecting and indicating burnout of a signal lamp of a motor vehicle. While of general utility, the circuit of the present invention is particularly adapted for use on a motor vehicle equipped with a large number of exterior signaling lamps such as, for example, a truck or bus.

When a vehicle is equipped with a plurality of signaling lamps, the failure of one of the lamps represents a very small change in the current drawn by the remaining lamp load. Consequently, the prior art burnout detection circuits which respond to this change in current have not been satisfactory in such applications. Moreover, such prior art circuits generally require an additional lamp mounted within the vehicle for indicating burnout of a signal lamp.

In accordance with the present invention, a lamp burnout detection circuit is provided which includes a transistorized bridge network which is operatively connected with the turn signaling circuit of the vehicle. The bridge circuit develops an output signal which is amplified to control a relay operatively connected with the conventional turn signal indicating lamp installed within the vehicle.

In conventional turn signal circuits the indicator lamp flashes when the turn signal mechanism is actuated to inform the driver of the energization of the turn signal circuit. In accordance with the objectives of the present invention, this operation which is familiar to the driver is maintained. The indicator lamp performs the additional function, however, when connected in the burnout detecting circuit of the present invention of indicating a burnout by constant energization during those phases of vehicle operations when the turn signaling circuit is not energized.

A more complete understanding of the present invention may be had from the following detailed description which should be read in conjunction with the drawings in which the single figure is a schematic view illustrating the invention.

Referring now to the single figure, a plurality of exteriorly mounted left and right signal lamps are designated 10 and 12 respectively. Matched resistors 14 and 16 connect the signal lamps 10 and 12 to one terminal of a source of D-C voltage 18 which is preferably the vehicle battery. Each of the signal lamps is connected to ground as is the other terminal of the battery 18. It will be apparent that the signal lamps 10 and 12 and the resistors 14 and 16 form the four legs of a bridge network having input terminals connected across the battery 18 and output terminals 20 and 21. The output terminals 20 and 21 are connected to stationary contacts 22 of a turn signal switch generally designated 24. The turn signal switch 24 also includes stationary contacts 26 and 27 and left and right movable contacts 28 and 30 respectively.

A flasher shown in block diagram and generally designated 32 may be of the type shown in copending application Ser. No. 346,905 assigned to the assignee of the present invention. For a more detailed description of the flasher, attention is directed to this application. In general, the flasher 32 includes a relay generally designated 34 which is periodically energized by a relaxation-type oscillator generally designated 36. The oscillator 36 is normally deenergized when the turn signal switch 24 is in the neutral position as shown in the figure. When the turn signal switch 24 is moved to either a left or right turn indicating position, the oscillator is connected across the battery 18 through the conductor 37 and the signal lamps 10 or 12. With the movable contacts 28 and 30 moved to a left turn indicating position 28' and 30' as shown in the dash lines, the relay 34 is periodically energized by the oscillator 36 to shunt the resistor 14 and connect the left signal lamps 10 directly to the source 18 through the conductor 38. The signal lamps 10 are thus flashed at the frequency of the oscillator 36. Similarly, if a right turn is signaled, the resistor 16 is periodically shunted through the conductor 38' and the right signal lamps 12 are flashed. With the turn signal switch 24 in the neutral position or when the flasher 32 presents an effective open circuit, the lamps 10 and 12 do not draw sufficient current to light because of the resistors 14 and 16.

When the turn signal switch 24 is in the neutral position, a detector circuit generally designated 40 is connected through the stationary contacts 22, 26 and 27 and the movable contacts 28 and 30 to the output terminals 20 and 21 of the aforementioned bridge network. The detector network 40 includes a pair of PNP transistors 42 and 44. The emitter of transistor 42 is connected to the base of transistor 44 and to the stationary contact 26. The emitter of transistor 44 is connected to the base of transistor 42 and to the stationary contact 27. The collectors of the transistors 42 and 44 are connected together and to ground through a resistor 46. An NPN transistor amplifier 48 controls the operation of a relay generally designated 50. The relay 50 includes a coil 52, connected in the collector circuit of the transistor 48, and an armature 54. A pair of voltage dividing resistors 56 and 58 establish a reference voltage at the base of the transistor 48. The emitter of transistor 48 is connected to ground through the resistor 46.

The burnout detection circuit of the present invention is particularly advantageous when utilized on a vehicle provided with a conventional turn signal indicating or pilot lamp located within the vehicle and readily observable by the driver to indicate operation of the turn signaling circuit. Such an indicator lamp is designated 60 in the schematic. The lamp 60 is adapted to be connected to one of two positions by the armature 54 of the relay 50 depending upon the state of energization of the coil 52. In the position shown, the armature 54 connects the indicator lamp directly to the battery 18 through a conductor 62. In the dash position the armature 54 connects the indicator lamp 60 to the flasher 32 through a conductor 64.

If the turn signal switch 24 is in the neutral position as shown in the figure, it will be apparent that the voltage at the output terminals 20 and 21 of the bridge network will be applied to the emitter and base electrodes respectively of transistor 42. Likewise, the voltage at the terminals 21 and 20 will be applied to the emitter and base electrodes respectively of the transistor 44. If the signal lamps 10 and 12 are in satisfactory condition, the voltage at the terminals 20 and 21 will be the same. With equal voltages at the emitter and base electrodes of the transistors 42 and 44, these transistors are non-conductive and thus no collector current flows through the resistors 46. Under this condition the transistor 48 is rendered conductive and energizes the coil 52 to draw the armature 54 to a position connecting the indicator lamp 60 to the flasher 32 through the conductor 64. If the turn signal switch 24 should now be placed in operating position, the signal lamps 10 or 12 and the indicator lamp 60 will be periodically energized. Movement of the contacts 28 and 30 to an operating position disconnects the stationary contacts 26 and 27 from the output terminals 20 and 21. This prevents the detector circuit from giving an erroneous output signal resulting from changes in the voltage at the terminals 20 and 21 which must necessarily occur at one terminal during operation of the flasher 32. It will be apparent, however, with the detector network 40 disconnected from the terminals 20 and 21 the transistor 48 will be conductive thereby maintaining the connection of the indicator lamp 60 to the flasher 32. Accordingly, the indicator lamp 60 performs the conventional function of flashing while the signal lamps 10 or 12 are energized and continues to do so even though one of the signal lamps may have burned out. If, however, a signal lamp has burned out and the turn signal switch 24 is in the neutral position which would normally occur after the turn is completed or during normal straight-ahead driving, a difference in potential will exist at the output terminals 20 and 21. This will render one of the transistors 42 or 44 conductive depending upon whether a lamp has burned out on the left or right side of the vehicle. If, for example, one of the left signal lamps 10 has burned out, the voltage at the terminal 20 will be positive with respect to the voltage at the terminal 21 thus raising the potential of the emitter with respect to the base of transistor 42 and rendering the transistor 42 conductive. The transistor 44 will be cut off since its base electrode will be positive with respect to the emitter electrode. If one of the right turn signal lamps 12 is burned out, the opposite condition will prevail. In either case, collector current will flow through the resistor 46 raising the potential at the emitter of transistor 48 causing it to be cut off thus deenergizing the coil 52 whereupon the armature 54 connects the indicator lamp 60 directly to the battery 18 through the conductor 62. The indicator lamp 60 is thus continuously energized to indicate to the driver that a signal lamp burnout has occurred.

While the invention has been described with regards to a preferred embodiment thereof, this should not be construed in a limiting sense. Numerous modifications and variations will occur to those skilled in the art. For a definition of the invention, reference is made to the appended claims.

I claim:
1. A lamp burnout indicating circuit comprising a bridge network having an input and an output terminal and including first and second impedance elements connected in series with a first and second plurality of signal lamps respectively,
means for connecting said input terminals to a source of voltage,
detector means for indicating an unbalance in said bridge and including first and second transistors having emitter, base and collector electrodes,
the emitter electrode of each of said transistors being connected to the base electrode of the other transistor with the collector electrodes of each transistor being connected together,
the emitter electrode of each of said transistors also being connected respectively to the output terminals of said bridge network whereby at least one of said transistors is rendered conductive when an unbalance exists in said bridge network,
a third transistor having emitter, base and collector electrodes,
means establishing a reference potential at the base electrode of said third transistor,
means establishing a potential at the emitter electrode of said third transistor in accordance with the output of said detector means,
relay means,
means for connecting said relay means between said source and the collector electrode of said third transistor,
an indicator lamp,
said relay means including an armature for connecting said indicator lamp to said source of voltage.
2. In a motor vehicle provided with the source of D-C voltage,
a plurality of left and right signal lamps mounted exteriorly of said vehicle,
an indicator lamp,
turn signal switching means movable from a neutral position to an operating position for selectively connecting said lamps to said source,
a flasher connected between said source and said lamps when said turn signal switch is in operating position for periodically disconnecting said lamps from said source,
the improvement comprising impedance means connected in series with said left and right signal lamps respectively to form a bridge network having input and output terminals,
means connecting said source to said input terminals,
detector means having input and output terminals,
said turn signal switch connecting the input terminals of said detector means to the output terminals of said bridge network when said turn signal switch is in a neutral position,
means responsive to the output of said detector means for disconnecting said indicator lamp from the output of said flasher and connecting said indicator lamp in parallel with said flasher.
3. In a motor vehicle having left and right signal lamps mounted exteriorly of said vehicle and an indicator lamp mounted within said vehicle,
a lamp burnout detection circuit comprising a source of D-C voltage,
first and second impedance elements connecting said left and right signal lamps respectively in series with said source,
a flasher,
a turn signal switch movable from a neutral position to an operating position,
detector means,
said turn signal switch connecting said detector means to the junction between said impedance means and said left and right signal lamps while in said neutral position,
said turn signal switch disconnecting said detector means from said junction and connecting said flasher in parallel with said impedance means while in an operating position,
relay means responsive to the output of said detector means for selectively connecting said indicator lamp in series with said flasher or in parallel with said flasher.
4. In a motor vehicle having left and right signal lamps mounted exteriorly of said vehicle and an indicator lamp mounted within said vehicle,
a lamp burnout detection circuit comprising a source of D-C voltage having first and second terminals,
first and second resistor means connecting said left and right signal lamps respectively to the first terminal of said source,
a flasher, a turn signal switch having left and right contact means movable from a neutral position to an operating position to selectively connect either of said left or right signal lamps to said source through said flasher, first and second transistors having input, output and common electrodes, the input electrode of each of said transistors being connected to the common electrode of the other transistor with the output electrodes of each transistor being connected together, said left and right contact means when located in said neutral position connecting the input electrode of said first and second transistors respectively to the junctions between said resistors and said signal lamps, means including a third resistor connecting the output electrodes of said first and second transistors to the second terminal of said source, a third transistor having input, output and common electrodes, relay means connecting the first terminal of said source to the output electrode of said third transistor, impedance means establishing a reference voltage at the common electrode of said third transistor, the input electrode of said third transistor being connected to said third resistor, said relay means including an armature operable in one position to connect said indicator lamp in series with said flasher and in a second position to connect said indicator lamp in parallel with said flasher.

References Cited
UNITED STATES PATENTS 2,843,802 7/1958 Brohl _____ 315—77
3,345,558 10/1967 Christian _____ 323—75

JOHN W. CALDWELL, *Primary Examiner.*

D. MYER, *Assistant Examiner.*